United States Patent [19]
Ennis et al.

[11] 3,929,642
[45] Dec. 30, 1975

[54] DEWATERING SYSTEM

[75] Inventors: Robert E. Ennis, West Simsbury, Conn.; Robert G. Derrick, Buffalo, N.Y.

[73] Assignees: Linatex Corporation of America, Stafford Springs, Conn.; Derrick Manufacturing Corporation, Buffalo, N.Y.

[22] Filed: Mar. 7, 1974

[21] Appl. No.: 448,937

[52] U.S. Cl. .............. 210/113; 210/116; 210/406; 210/416; 209/256; 137/525.1
[51] Int. Cl.² .......................................... B01D 33/38
[58] Field of Search .......... 209/256, 258, 268, 223, 209/491, 494, 242, 496, 250, 398, 399; 210/112, 113, 114, 115, 116, 143, 406, 416; 137/525.1; 162/228, 229, 293

[56] References Cited
UNITED STATES PATENTS

| | | | |
|---|---|---|---|
| 3,116,237 | 12/1963 | Fontein et al. | 209/242 |
| 3,319,404 | 5/1967 | Lowther | 137/525.1 |
| 3,421,666 | 1/1969 | Lawson | 209/223 R |
| 3,426,908 | 2/1969 | Davis et al. | 210/406 |
| 3,595,266 | 7/1971 | Brookman | 137/525.1 |
| 3,719,276 | 3/1973 | Allen et al. | 209/246 |

*Primary Examiner*—Thomas G. Wyse
*Assistant Examiner*—F. F. Calvetti
*Attorney, Agent, or Firm*—Prutzman, Hayes, Kalb & Chilton

[57] ABSTRACT

A dewatering system employing a vibrating screen deck is provided with a vacuum chamber positioned beneath the downstream screen of the deck for removing substantial additional amounts of water from a bed of solid particulate material passing along the top surface thereof. The vacuum chamber is provided with an air pump for drawing air out of a vacuum chamber and with a water discharge regulator for sealing the chamber to assure passage of air into the chamber through only the overlying downstream screen panel. The water discharge regulator is a self-operating flexible member comprised essentially of a pair of flat generally rectangular rubber-like sheets arranged in confronting relationship and sealed along opposite edges. The sheets are provided with central reinforcing and stabilizing pads located on opposite sides of the regulator for urging the flat sheets into intimate surface contact to provide a closed sealed condition for accumulating water drawn into the vacuum compartment. The regulator is sufficiently flexible to permit controlled separation of the sheets for discharging the water within the vacuum chamber in response to the amount of water accumulated therein.

7 Claims, 4 Drawing Figures

DEWATERING SYSTEM

BACKGROUND AND SUMMARY OF THE INVENTION

The present invention relates generally to a system for dewatering granular solids and is more particularly concerned with a new and improved dewatering system and technique particularly adapted for use in dewatering aggregate slurries containing solids having a wide range of particle size.

In the processing and handling of aggregate materials such as sand, gravel or crushed stone, as well as in related industries such as the coal, slag, iron ore, phosphate, potash, primary metal and related chemical industries, it is necessary to utilize relatively large quantities of water or other liquids in conjunction with or as a dispersing medium for granular solid particles produced in the respective grading, concentrating or other processes. At some point in these processes, it is usually necessary to subsequently effect a separation or dewatering of these solid aggregate materials.

One method of dewatering fine granular material prior to disposing of the waste water or other liquid has been to subject the mixture to the operation of suitable dewatering devices. The most widely employed method for dewatering in the mineral aggregates industry is an inclined screw dehydrator which slowly moves the solid material up the incline of a screw thread out of a feed basin while permitting back flow of the water to waste. However, such equipment has limited water handling capacity and is plagued by the loss of valuable fine sands and a relatively high water content in the resultant granular product. Also, such equipment consumes an appreciable amount of energy.

Another technique involves the use of centrifugal force to remove the free moisture. However, the high cost, high power consumption, and wear characteristics associated with such centrifuge apparatus have prevented the wide use of that technique on a commercial basis for handling abrasive materials. Similarly, the use of pressure or vacuum filters employing woven filter media has not been commercially attractive, particularly for the sand, gravel and crushed stone industries.

Another technique employed for dewatering fine particle slurries is the use of vibrating screens. The decks of these screens have taken the form of finely woven wire cloth or a plurality of parallel steel rods or strips separated by small gaps of predetermined gauge. The rod decks are generally constructed of stainless steel wedge shaped members and attempts have been made to cap the metal rods with abrasion resistant rubber or completely replace the rods with rubber strips.

As can be appreciated, the industry is constantly seeking new and improved methods for dewatering large quantities of fine solid slurries. An improved dewatering screen deck and dewatering method that obviates many of the deficiencies and difficulties encountered in prior dewatering techniques is disclosed in our copending U.S. patent application, Ser. No. 371,170 filed June 18, 1973, now abandoned, and entitled "Screen Assembly and Dewatering Technique." The vibrating dewatering screen deck panel of that application oscillates at a predetermined frequency and provides a random array of independently pulsating dewatering diaphragms that rapidly and efficiently dewater or separate the liquid phase from a slurry containing solids of fine particle size. Such a system is effective to reduce the free moisture content of fine solids so that such material may be easily conveyed to stockpiles. However, for some applications, such as the treatment of finely sized granular iron ore, it is desirable to reduce the moisture to very low levels so as to minimize energy requirements for completely drying the material for subsequent transport or processing. In order to achieve this reduced water level it has been necessary to use expensive rotary vacuum filters having high power requirements. Additionally such equipment utilizes finely woven filter media that have a relatively short operating life and require a prolonged machine "downtime" for replacement.

Accordingly, it is an object of the present invention to provide a new and improved dewatering system that retains the advantage of vibratory screen dewatering yet significantly reduces the free moisture content of the solid particulate material discharged therefrom.

Another object of the present invention is to provide a method of dewatering fine granular slurries which achieves comparable or lower retained water levels yet requires significantly lower cost and power consumption than that required by apparatus such as rotary vacuum filters using finely woven filter media.

Another object of the present invention is to provide a new and improved dewatering mechanism that utilizes a compartment of reduced pressure for assisting in the removal of water from the downstream portion of a vibrating dewatering screen so as to significantly reduce the amount of surface moisture within the bed of solid particulate material discharged therefrom.

Still another object of the present invention is to provide a new and improved dewatering system of the type described that is capable of further reducing the moisture level of the discharged solid particulate mass by as much as about 20% without reducing the output capabilities of the dewatering unit. Included in this object is the provision for a simple yet effective modification of conventional dewatering decks capable of outperforming complex filtering units while substantially reducing the cost and power requirements and providing an operating life that far exceeds that of filter media used in more expensive dewatering units.

A further object of the present invention is to provide a new and improved dewatering system of the type described that includes a fluid regulator for periodically discharging the water accumulated within a vacuum compartment in response to the amount of water accumulated and without adversely affecting the pressure conditions within the compartment.

A still further object of the present invention is to provide a new and improved dewatering system of the type described that includes vacuum assist water removal and a fluid flow regulator responsive to water pressure within the vacuum assist chamber to periodically discharge water accumulated therein. Included in this object is the provision for a self-operating regulator of simple, durable construction that can be quickly removed and replaced without prolonged shut down of the dewatering system.

Other objects will be in part obvious and in part pointed out in more detail hereinafter.

These and related objects are accomplished in accordance with the present invention by providing a new and improved dewatering system for granular solid material comprised of an elongated screen deck having a top surface along which a bed of solid granular material travels during the dewatering operation and a discharge edge at one end thereof. The system includes a vacuum compartment positioned beneath a downstream screen panel portion of the deck, the compartment being in communication with the underside of the panel portion for assisting in the removal of additional fluid from the bed of solid material passing along the overlying top surface. An air pump is associated with the compartment for producing a pressure drop between the top surface and the underside of the panel portion and a water discharge regulator is provided for periodically discharging water from the compartment in response to the amount of water accumulated therein.

A better understanding of the objects, advantages, features, properties and relations of the invention will be obtained from the following detailed description and accompanying drawing which set forth an illustrative embodiment indicative of the way in which the principle of the invention is employed.

DESCRIPTION OF A PREFERRED EMBODIMENT

Figure 1:
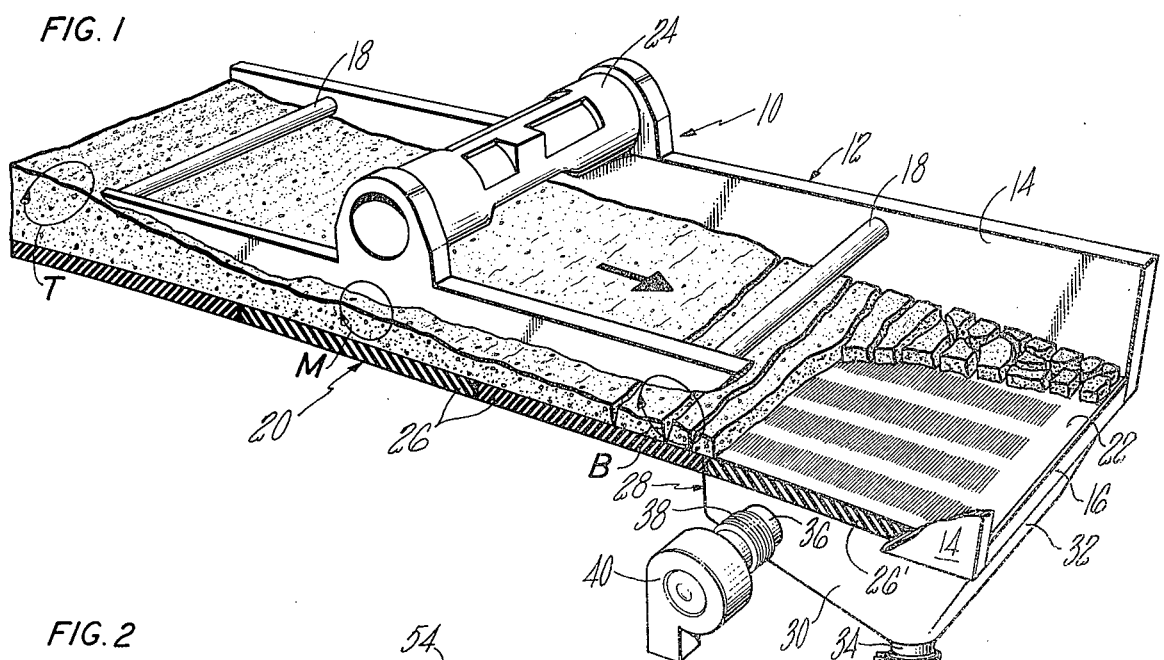
FIG. 1 is a perspective view partially broken away and partially in section, of a dewatering screen deck incorporating the features of the present invention.
Figure 2:
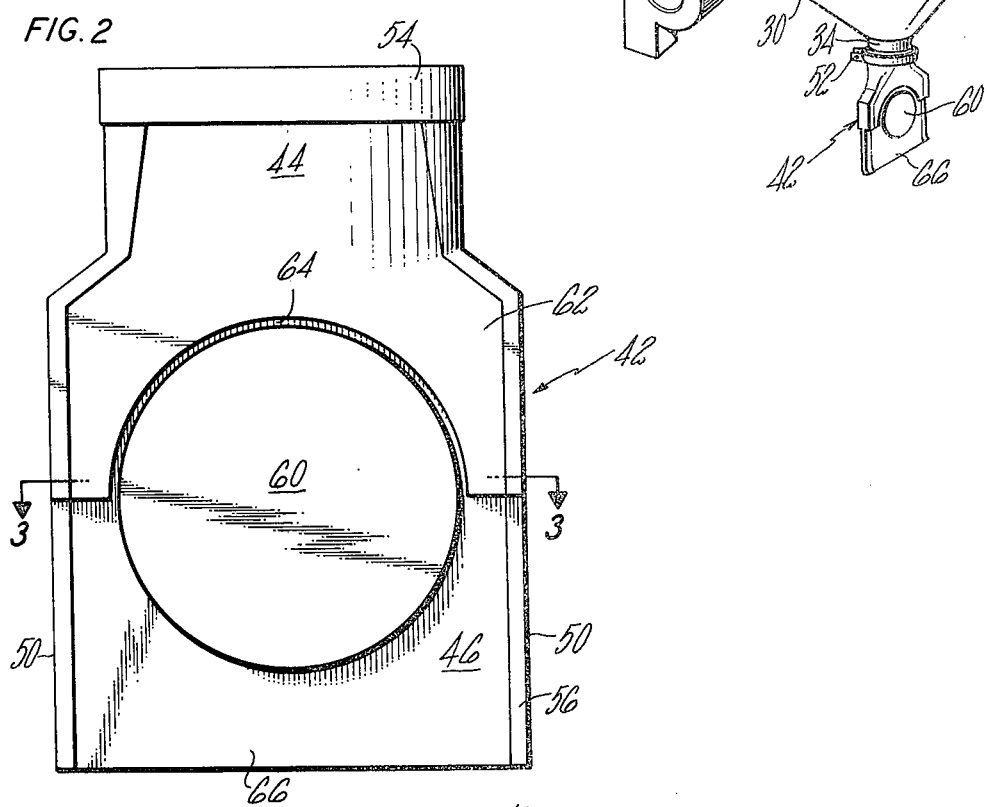
FIG. 2 is an enlarged elevational view of one embodiment of a fluid discharge regulator utilized in the system of FIG. 1.

Referring now to the drawing in greater detail wherein like reference numerals indicate like parts throughout the several figures, FIG. 1 illustrates one embodiment of a dewatering unit 10 utilizing the features of the present invention. The unit 10 takes the form of a generally U-shaped spillway inclined so as to receive the aqueous slurry of solid granular material at the raised or elevated end thereof. The machine consists of a U-shaped frame 12 having solid upstanding side walls 14 secured in spaced parallel relationship by a plurality of base beam supports 16 and a plurality of transverse bracing members 18. An elongated generally rectangular screen deck 20 is mounted on the beam supports 16 of the frame 12 and forms a base of the U-shaped spillway having a continuous top surface 22 along which the aggregate bed of material travels. A vibrating motor assembly 24 is supported by the side walls 14 and extends therebetween about midway between the ends of the spillway. As shown, a plurality of individual screen panels 26 preferably are utilized in forming the screen deck 20 and can be arranged so as to provide the continuous smooth top screening surface 22, or, alternatively, can be arranged so as to cause the cascading effect as the slurry of solid material passes from one screen panel to the next.

The vibratory motor assembly 24 illustrated in the embodiment of FIG. 1 and found particularly advantageous in the present invention is a motor constructed to impart high frequency low amplitude vibratory motion to the screen deck 20. Although other vibrating mechanisms, both mechanical and electrical, may be employed, it is generally preferred to use a mechanism that will impart to the screen deck a high frequency rocking motion and in this connection the high speed, low amplitude induction motors sold by Derrick Manufacturing Corporation have proven particularly beneficial. These motors are high speed units typically operating at a frequency of from about 1,800 rpm up to about 3,600 rpm, even under high load conditions.

As mentioned hereinbefore, the screen deck 20 is illustrated as being comprised of a plurality of individual screen panels 26 that are preferably arranged so as to provide a smooth screening top surface 22. The panels are of relatively thick sheet material and of unitary one piece construction comprised of wear-resistant, elastomeric or rubber like material that has been selectively slit to provide the desired dewatering action. These screen panels are described in greater detail in our copending U.S. patent application Ser. No. 371,170 mentioned hereinbefore and the disclosure therein is incorporated herein by reference. As will be appreciated, the present invention is not limited to a specific type of screen panel or vibratory motor but has produced excellent results with the units illustrated.

In accordance with the present invention a vacuum chamber of compartment 28 is positioned beneath the lower or downstream screen panel 26' of the deck 20 and is in communication with the underside of the panel which fully encloses and forms the top of the vacuum compartment. The compartment is appropriately configured so that it is generally rectangular at its plane of interconnection with panel 26 and is provided with side walls 30 and front and rear walls 32, all of which can taper along their full length or along only the lower portion thereof so as to converge at a relatively central cylindrical discharge pipe 34 that extends downwardly from the compartment and forms an integral portion thereof. One side wall 30 of the compartment is also provided with a cylindrical outlet pipe or port 36 suitably connected through a flexible conduit 38 with an exhaust fan 40 or similar device for drawing air from the interior of the compartment 28. The outlet of the fluid discharge pipe 34 is sealed by means of a water discharge regulator 42 so that the air drawn from the compartment by the exhaust fan 40 must enter the chamber through the screen panel 26'.

As will be appreciated, the size and capacity of the exhaust fan and the reduced pressure created within the vacuum chamber will vary depending on many factors including the size of the dewatering apparatus and the materials selected for dewatering. However, as a typical example, a dewatering panel having a top surface of approximately four feet by ten feet may use a one-half horsepower exhaust blower having a speed of about 1,800 rpm capable of producing a vacuum of 1½ inches of water and displacing about 460 cubic feet per minute through a 6 inch inlet hose. Such exhaust blowers are commercially available and the operating capabilities thereof can readily be tailored to the specific use to which the dewatering deck is to be applied. However, the exhaust fan should be of sufficient strength to generate a reduced pressure sufficient to provide removal of significant additional amounts of surface moisture from those particles passing across the top surface of the downstream screen panel.

The vacuum or suction force applied to the compartment by the blower 40 will cause water to be drawn from the material and to pass through the screen panel for collection within the bottom of the vacuum compartment. Accordingly, it is necessary that at least a portion of the accumulated water be periodically removed from the compartment and that the discharge of the water from the compartment take place without adversely affecting the vacuum or pressure conditions within the compartment. In other words, the water discharge should be controlled by a regulator capable of periodically withdrawing water from the compartment. Additionally, it is essential that the regulator be capable of discharging the water without the necessity for interrupting the continuous operation of the dewatering screen and also without allowing air to enter the compartment through the discharge pipe 34.

Figure 3:
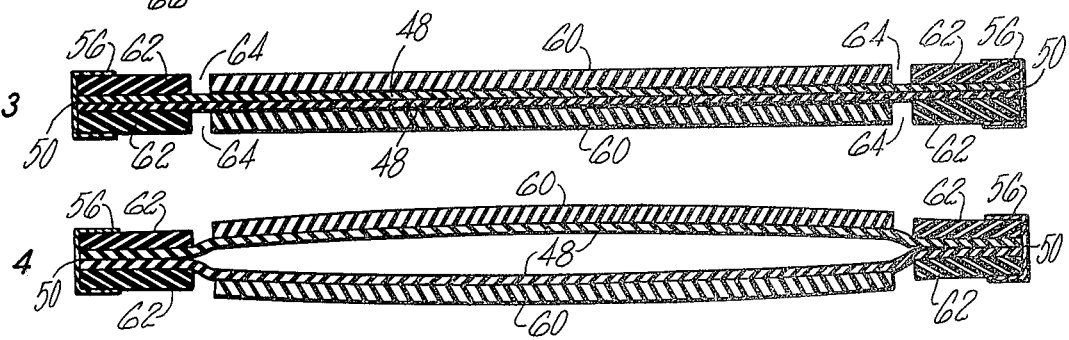
FIG. 3 is a further enlarged sectional view taken along the line 3—3 of FIG. 2 showing the regulator in its closed position; and, FIG. 4 is a sectional view similar to FIG. 2 showing the regulator in an open position for discharging fluid accumulated within the vacuum chamber.

In accordance with the preferred embodiment, the discharge regulator 42 takes the form of a resilient, selfsealing and flexible member constructed entirely of wearresistant elastomeric or rubber like material. The particular regulator illustrated is similar in construction to the overflow regulators utilized with separating cyclones and similar apparatus. As best seen from FIGS. 3 and 4, the regulator 42 consists of a circular neck portion 44 and a flat, generally rectangular diaphragm portion 46 integrally formed from a pair of resilient synthetic of natural rubber sheets 48 that are sealed along opposite side edges 50. The two sheets 48 are firmly and sealably adhered together by adhesives, clips or the like only along their side edges 50 so as to maintain an unsealed condition through most of the remaining confronting surface area of the two sheets. The generally elliptical neck portion 44 at the top of the regulator provides a sleeve having an internal size approximately equal to the size of the discharge pipe 34 of the vacuum compartment 28. This permits the neck of the regulator 42 to be slidably mounted on the discharge pipe 34 and secured thereto by a suitable retaining bracket or clip such as clamp 52. The top edge of the regulator's neck portion is provided with a protective collar 54 to provide additional reinforcement and assure a positive seal with the discharge pipe 32 to insure preservation of the reduced pressure condition within the compartment and prevent leakage of air or water therethrough. Similarly the edges 50 can be covered with a reinforcing strip 56.

As mentioned, the regulator is formed essentially of two flat generally rectangular sheet members 48. However, when a specific head of water is present within the compartment but will automatically and effectively move to a closed condition as soon as the water falls below a specific pressure level because of the vacuum condition within the compartment.

Figure 4:
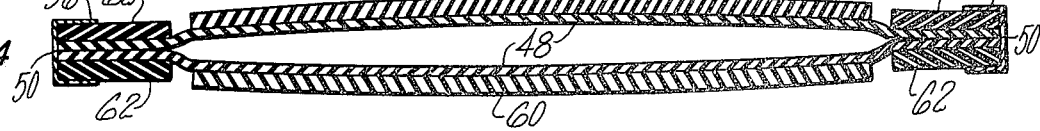

The material from which the regulator is made is sufficiently flexible to allow the two adhered sheets 48 to open so as to assume the configuration shown in FIG. 4. At the same time the reinforcing members, particularly pads 60, function to rapidly and completely return the pads 46 to their confronting and abutting sealed configuration illustrated in FIG. 3. In this connection the degree of flexing at spacing 64 is illustrated in exaggerated form to place emphasis on the closing ability of stabilizing pad 60. Thus, it will be understood the material must be sufficiently flexible to provide for discharge of limited amounts of accumulated water but at the same time also be capable of returning to the original flat configuration illustrated in FIG. 3 to sealably close the regulator and maintain the vacuum compartment at its desired pressure level.

Tests on a variety of fine granular materials have shown that the vacuum assist apparatus described herein will remove as much as an additional 20% of the moisture contained within the bed of material reaching the downstream screen panel of the dewatering apparatus. For example, operation of a dewatering screen deck without the vacuum assist device was effective in dewatering finely sized granular iron ore concentrate containing 30% to 35% to a moisture content of 21% water by weight. When the identical dewatering screen was operated using the unit of the present invention with a one-half horsepower exhaust fan of the type described hereinbefore, it was found that the moisture level of the resultant granular iron ore concentrate product reduced to a level of 17%, representing a 19% improvement in moisture level, such an improvement is of substantial commercial importance particularly in view of the fact that dewatered mineral products frequently must be completely dried for subsequent processing. Such drying is typically done in oil-fired or gas-fired dryers and it will be appreciated that a lower moisture content will result in a lower energy consumption in the dryer apparatus. Additionally, it has been found that the dewatering system of the present invention equals the performance or outperforms more complex filtering apparatus of substantially greater cost. For example, the dewatering system of the present invention provides equivalent or better dryness in dewatered iron ore concentrate than a rotary vacuum filter apparatus of substantially greater cost and power requirement with the dewatering deck of the system lasting at least 100 times longer than the filter media used in the rotary vacuum filter system. It should be noted that this improvement is effected at substantially the same capacity of concentrate. Thus, as can be seen from the foregoing detailed description the present invention provides a new and improved yet simplified system for significantly reducing the amount of moisture from fine granular slurries at a substantially reduced cost without adversely affecting the capacity of the dewatering system.

As will be apparent to persons skilled in the art, various modifications, adaptations and variations of the foregoing specific disclosure can be made without departing from the teaching of the present invention.

We claim:

1. In a dewatering system for granular solid material comprised of an elongated vibratory screen deck having a top surface along which a bed of solid granular material travels relative to said top surface during dewatering and a discharge edge at one end thereof, the combination including a vacuum compartment positioned beneath a screen panel portion of said deck adjacent said one end, said compartment being in communication with the underside of said panel portion for assisting in removal of additional amounts of fluid from the bed of solid material moving relative to the vibratory overlying top surface, an air pump associated with said compartment for producing a pressure drop between said top surface and said underside of the panel portion overlying the chamber and a water discharge regulator for periodically discharging water from said compartment in response to the amount of water accumulated therein, said water discharge regulator being a self-operating, flexible member having a neck portion and a diaphragm portion movable between an open discharge position and a closed sealed position, said diaphragm portion depending integrally from said neck portion and having a reinforced top section and a central stabilizing pad extending downwardly therefrom, said central stabilizing pad being operative for constantly biasing said diaphragm portion into its closed flat position and being movable into its open position in response to the water pressure within the compartment acting on said reinforced section.

2. The dewatering system of claim 1 wherein the vacuum compartment has an air outlet port and a separate water outlet port, said air outlet port being connected to said air pump to facilitate air removal from said chamber to establish said pressure drop, said regulator being positioned at said water outlet port for controlling said periodic water discharge.

3. The dewatering system of claim 2 wherein said regulator seals said water outlet port and said air pump is exhaust fan for drawing air through said screen panel portion and the bed of material thereon.

4. The dewatering system of claim 1 wherein said water discharge regulator has a neck portion secured to said compartment for receiving water accumulated therein and an automatic fluid release portion integrally depending from said neck portion and movable between open and closed positions in response to the amount of water within the chamber.

5. The dewatering system of claim 1 wherein said reinforced top section is of Y-shaped configuration and said central stabilizing pad is circular and is spaced from said top section and extending downwardly therefrom, said pad being operative for urging the regulator into its closed condition, the spacing between the pad and the top section facilitating opening of the regulator by fluid bearing thereagainst.

6. The dewatering system of claim 1 wherein the vacuum compartment has a water outlet port, said regulator being positioned at said water outlet port for controlling said periodic water discharge, said regulator being comprised of a pair of flat sheet members movable between a closed position in intimate confronting surface engagement and an open position in spaced confronting relationship.

7. The dewatering system of claim 1 wherein the water discharge regulator is a self-operating flexible member comprised essentially of a pair of flat generally rectangular rubber-like sheets arranged in confronting relationship and sealed along opposite side edges, said sheets being provided with central reinforcing and stabilizing pads located on opposite sides of the regulator for urging the sheets into intimate surface engagement to provide a closed sealed condition for accumulating water within the vacuum compartment.

* * * * *